Figures 1, 2, 3, 4:
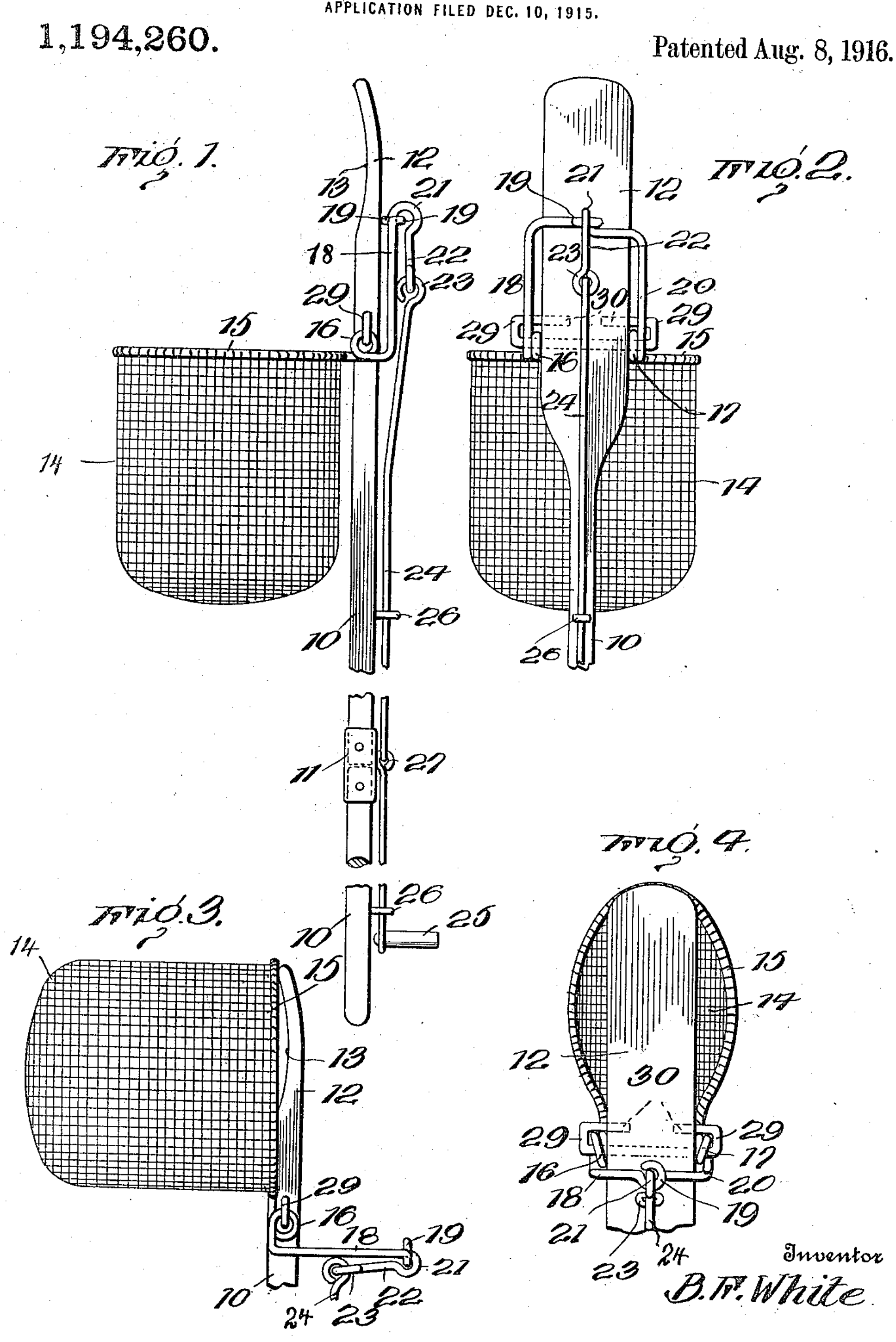

B. F. WHITE.
FRUIT GATHERER.
APPLICATION FILED DEC. 10, 1915.

1,194,260. Patented Aug. 8, 1916.

Inventor
B. F. White

By

Attorneys.

THE NORRIS PETERS CO., PHOTO-LITHO., WASHINGTON, D. C.

UNITED STATES PATENT OFFICE.

BENJMIN F. WHITE, OF WINNSBORO, TEXAS, ASSIGNOR OF ONE-HALF TO JOHN S. McLEOD, OF BIVINS, TEXAS.

FRUIT-GATHERER.

1,194,260. Specification of Letters Patent. Patented Aug. 8, 1916.

Application filed December 10, 1915. Serial No. 66,124.

*To all whom it may concern:*

Be it known that I, BENJMIN F. WHITE, a citizen of the United States, residing at Winnsboro, in the county of Franklin and State of Texas, have invented certain new and useful Improvements in Fruit-Gatherers, of which the following is a specification.

This invention relates to improvements in devices for gathering fruit from trees, and has for one of its objects to improve the construction and increase the efficiency and utility of devices of this character.

Another object of the invention is to provide a simply constructed device whereby the fruit is picked without injury either to the fruit or to the trees.

With these and other objects in view, the invention consists in certain novel features of construction as hereinafter shown and described and then specifically pointed out in the claim; and in the drawings illustrative of the preferred embodiment thereof Figure 1 is a side elevation of the improved device with the gathering receptacle in position to receive the fruit; Fig. 2 is a rear elevation with the parts arranged as shown in Fig. 1; Fig. 3 is a view similar to Fig. 1 showing the receptacle in closed position; Fig. 4 is a rear elevation of the device with the parts arranged as shown in Fig. 3.

The improved device comprises a staff or pole, represented conventionally at 10, and constructed in two or more portions united by a coupling member 11, so that the staff or pole may be extended to any required length, or the parts separated for transportation or storage.

At its upper end the staff is widened, as represented at 12 and one face of the widened portion curved, as represented at 13. A receptacle for the fruit is mounted to swing upon the widened portion 12 of the staff and comprises a rim member from which a basket-like structure, indicated at 14, is suspended. The rim of the receptacle and the means whereby the receptacle is mounted to swing upon the staff is formed from a single rod and comprises a hoop-like portion 15 bent into eyes 16—17 and one side continued at right angles to the hoop-like portion, as represented at 18 and thence extended laterally and terminating in an eye or loop 19, the latter being disposed substantially opposite the center of the staff, as illustrated in Fig. 2. At the opposite side the rod is extended at right angles to the hoop-like portion 15, as illustrated at 20 and thence extended laterally and passed through the eye 19, as represented at 21, and thence extended in the form of an arm 22 substantially in parallel relation to the portion 18 and 20 and mid-way between them, as shown in Fig. 2. The arm 22 terminates in an eye or loop 23 to which a pull rod 24 is connected. The rod 24 extends in parallel relation to the staff or pole 10 and terminates in a hand grip 25. The rod is conducted through guide loops 26 on the staff 10 and is preferably formed in two parts connected by eyes 27 substantially opposite the coupling member 11 to enable the rod and handle to be folded together when the coupling member is disconnected.

The hoop-like portion 15 of the receptacle support is preferably elliptical, as illustrated in Fig. 4, so that when the pull member 24 is actuated to move the receptacle into the position shown in Figs. 3 and 4 the sides of the receptacle are extended beyond the side edges of the widened portion 12 of the staff to provide spaces for the stems of the fruit, the spaces being less in width than the fruit, so that the latter will be held within the receptacle when the latter is elevated to enable the fruit to be severed from its stem. This is an important feature of applicant's device, and obviates the necessity for employing a cutting implement for the stems, as the fruit can be torn loose from the tree by a downward or lateral pull. A pivot rod 29 extends through the eyes 16—17 and is preferably turned inwardly, as indicated at 30. By this means the support for the receptacle is mounted for rotation upon the widened portion of the staff.

The improved implement is simple in construction, can be inexpensively manufactured and employed for gathering various kinds of fruit, and enables the operator to gather the fruit from the tallest trees, and without the necessity for employing ladders or like supports. The portion 14 of the device may be of any suitable material or fabric, but will preferably be of wire cloth or like material, and may be of any required size or shape.

Having thus described the invention, what is claimed as new is:—

In a fruit gatherer, a staff, a support for a receptacle formed from a single rod bent intermediate the ends into a relatively large loop to form a rim to the receptacle and smaller loops to receive pivot devices whereby the support may be swingingly mounted on to the staff, one terminal of the support being formed into an eye and the other terminal of the support passing through the eye and extended into an arm, and means connected to said arm for swinging said receptacle support upon its pivots.

In testimony whereof, I affix my signature.

BENJMIN F. WHITE. [L. S.]

Witnesses:
B. B. WHITE,
S. Y. COOPER.

Copies of this patent may be obtained for five cents each, by addressing the "Commissioner of Patents, Washington, D. C."